(12) United States Patent
Tseytlin et al.

(10) Patent No.: US 12,546,838 B2
(45) Date of Patent: Feb. 10, 2026

(54) BIMODAL EPR RESONATOR WITH AUTOMATIC ELECTRICALLY CONTROLLED INTER-MODE ISOLATION

(71) Applicant: West Virginia University Board of Governors on Behalf of West Virginia University, Morgantown, WV (US)

(72) Inventors: Mark Tseytlin, Morgantown, WV (US); Oxana Tseytlin, Morgantown, WV (US); Ryan O'Connell, Morgantown, WV (US)

(73) Assignee: WEST VIRGINIA UNIVERSITY BOARD OF GOVERNORS ON BEHALF OF WEST VIRGINIA UNIVERSITY, Morgantown, WV (US)

( * ) Notice: Subject to any disclaimer, the term of this patent is extended or adjusted under 35 U.S.C. 154(b) by 109 days.

(21) Appl. No.: 18/573,673

(22) PCT Filed: Jun. 24, 2022

(86) PCT No.: PCT/US2022/034970
§ 371 (c)(1),
(2) Date: Dec. 22, 2023

(87) PCT Pub. No.: WO2022/272113
PCT Pub. Date: Dec. 29, 2022

(65) Prior Publication Data
US 2024/0302462 A1    Sep. 12, 2024

Related U.S. Application Data

(60) Provisional application No. 63/214,518, filed on Jun. 24, 2021.

(51) Int. Cl.
*G01R 33/34*  (2006.01)
*G01R 33/60*  (2006.01)
*H03J 3/32*   (2006.01)

(52) U.S. Cl.
CPC . *G01R 33/34046* (2013.01); *G01R 33/34007* (2013.01); *G01R 33/60* (2013.01); *H03J 3/32* (2013.01)

(58) Field of Classification Search
CPC ........ G01R 33/34046; G01R 33/34007; G01R 33/60; G01R 33/3628; H03J 3/32
See application file for complete search history.

(56) References Cited

U.S. PATENT DOCUMENTS

2015/0185299 A1* 7/2015 Rinard ............. G01R 33/34061
                                                           324/322
2019/0044385 A1   2/2019  Vu et al.

FOREIGN PATENT DOCUMENTS

JP       2008180510 A     8/2008

OTHER PUBLICATIONS

International Search Report for PCT/US22/34970 mailed Oct. 7, 2022.

(Continued)

*Primary Examiner* — G. M. A Hyder
(74) *Attorney, Agent, or Firm* — Thomas | Horstemeyer, LLP

(57) ABSTRACT

Various examples are provided related to bimodal electron paramagnetic resonance (EPR). In one example, a bimodal resonator includes a detection coil; first and second excitation coils, where the excitation coils are non-parallel separated by a fixed angle; and excitation controllers coupled to the first and second excitation coils. The excitation controllers can adjust radio frequency (RF) fields generated by the first and second excitation coils to produce a resonator field substantially parallel with the detection coil. In another example, a method including generating a first RF field by exciting the first excitation coil; generating a second RF field by exciting the second excitation coil; and producing a resonator field substantially parallel with a detection coil of (Continued)

the bimodal resonator by adjusting the RE field of the first excitation coil, the RF filed of the second excitation coil, or both.

14 Claims, 3 Drawing Sheets

(56) References Cited

OTHER PUBLICATIONS

Guo, et al., "The design of band EPR cavity with narrow detection aperture for in vivo fingernail dosimetry after accidental exposure to ionizing radiation", Scientific Reports, Feb. 8, 2021.

\* cited by examiner

BIMODAL EPR RESONATOR WITH AUTOMATIC ELECTRICALLY CONTROLLED INTER-MODE ISOLATION

CROSS REFERENCE TO RELATED APPLICATIONS

This application is the 35 U.S.C. § 371 national stage application of PCT Application No. PCT/US2022/034970, filed Jun. 24, 2022, which claims priority to, and the benefit of, U.S. provisional application entitled "Bimodal EPR Resonator With Automatic Electrically Controlled Inter-Mode Isolation", having Ser. No. 63/214,518, filed Jun. 24, 2021, both of which are hereby incorporated by reference herein in their entireties.

STATEMENT REGARDING FEDERALLY SPONSORED RESEARCH OR DEVELOPMENT

This invention was made with government support under R01 EB023888 awarded by the National Institutes of Health. The Government has certain rights in the invention.

BACKGROUND

Bimodal resonators are used in use in electron paramagnetic resonance (EPR) spectroscopy. In EPR, radiofrequency (RF) power is used to generate spin signals. The energy of these signals is many orders of magnitude smaller compared to the RF energy. In continuously-wave EPR, these weak signals are detected in the presence of strong RF.

SUMMARY

Aspects of the present disclosure are related to bimodal electron paramagnetic resonance (EPR). In one aspect, among others, a bimodal resonator comprises a detection coil; first and second excitation coils, where the excitation coils are non-parallel separated by a fixed angle; and excitation controllers coupled to the first and second excitation coils, the excitation controllers configured to adjust radiofrequency (RF) fields generated by the first and second excitation coils to produce a resonator field substantially parallel with the detection coil. In one or more aspects, the excitation controllers can comprise voltage-controlled capacitors (VCCs) that are switched to control the RF fields generated by the first and second excitation coils. The excitation controllers can comprise digitally tunable capacitors (DTCs) that are switched to control the RF fields generated by the first and second excitation coils. The fixed angle can be in a range from about 5 degrees to about 60 degrees, or in a range from about 5 degrees to about 45 degrees, or in a range from about 10 degrees to about 30 degrees.

In another aspect, a method comprises providing a bimodal resonator comprising first and second excitation coils, where the excitation coils are non-parallel separated by a fixed angle; generating a first radio frequency (RF) field by exciting the first excitation coil; generating a second RF field by exciting the second excitation coil; and producing a resonator field substantially parallel with a detection coil of the bimodal resonator by adjusting the RF field of the first excitation coil, the RF filed of the second excitation coil, or both. In various aspects, the excitation of the first and second excitation coils can be supplied by corresponding excitation controllers. The corresponding excitation controllers can comprise voltage-controlled capacitors (VCCs) that are switched to control the RF fields generated by the first or second excitation coil. The corresponding excitation controllers can comprise digitally tunable capacitors (DTCs) that are switched to control the RF fields generated by the first or second excitation coil. In one or more aspects, the excitation of the first and second excitation coils can be adjusted by controlling current through that excitation coil. The fixed angle can be in a range from about 5 degrees to about 60 degrees, or in a range from about 5 degrees to about 45 degrees, or in a range from about 10 degrees to about 30 degrees.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
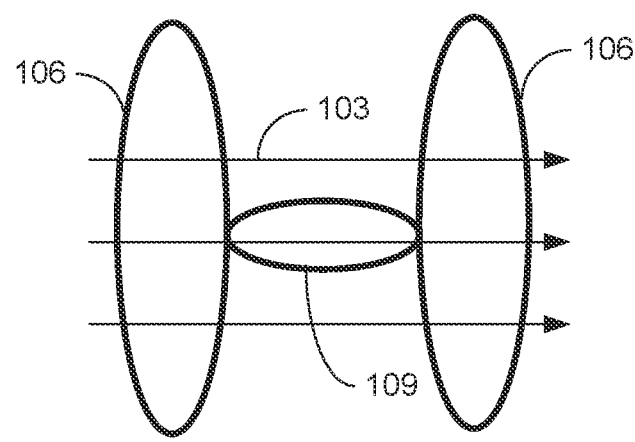
FIG. 1 is a schematic of a bimodal resonator comprising parallel excitation coils, in accordance with various embodiments of the present disclosure.

Disclosed herein are various examples related to bimodal electron paramagnetic resonance (EPR). Reference will now be made in detail to the description of the embodiments as illustrated in the drawings, wherein like reference numbers indicate like parts throughout the several views.

FIG. 1 illustrates an example of a bimodal resonator. In the existing technology, orthogonal decoupled loops. An excitation RF field 103 generated by excitation coils 106, which is substantially parallel to the detection coil 109. The two orthogonal coils are mechanically rotated one with respect to the other to achieve "fine" tuning. There are several disadvantages to this approach. For example, automation is not possible. The isolation needs to be readjusted during experiments (in vivo imaging) in real-time. In addition, the mechanical system that permits adjustments is sensitive to vibrations (high frequency sound generated during experiments). The result is an amplified background signal that contaminates the data.

A resonator is proposed that can decouple the excitation RF from the detection. Electrically controlled circuits permit very fine adjustment of the decoupling down to 60-70 dB by varying the current in the coils of the excitation resonator. The proposed bimodal resonator permits the use of higher RF power without saturation of the detection system to improve EPR sensitivity.

Figure 2:
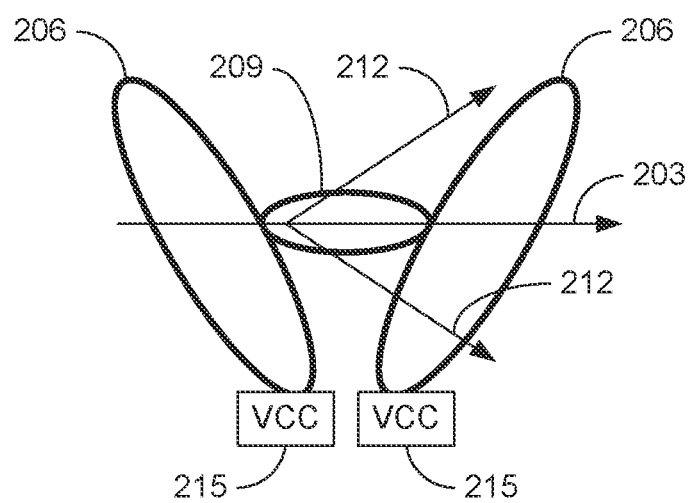
FIG. 2 is a schematic of a bimodal resonator comprising non-parallel excitation coils, in accordance with various embodiments of the present disclosure.
Figure 3:
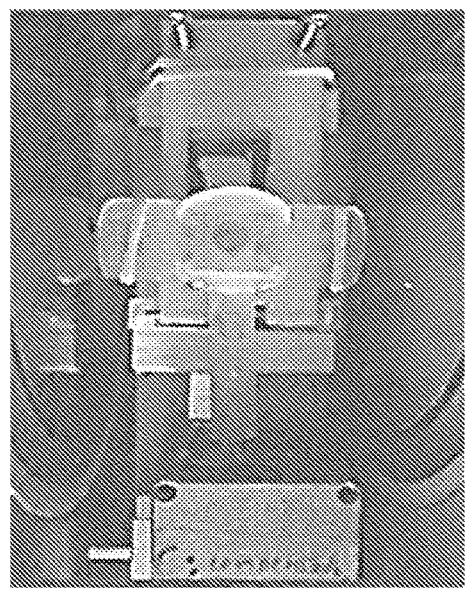
FIG. 3 is an image of an implemented bimodal resonator comprising parallel excitation coils, in accordance with various embodiments of the present disclosure.

FIG. 2 illustrates the relationship between the two non-parallel excitation loops 206 and the detection loop 209. Each of the two excitation coils 206 can be excited to generate RF fields 212 that are not parallel to the detection coil 209. The loops are connected in parallel to each other. As a result, higher current will flow in the loop with the lowest impedance. Higher current is translated into the higher excitation magnetic field produced by the coil with lower impedance. The impedance of each coils is controlled independently. As a result, the excitation of the two loops 106, the vector sum of the generated fields 212 (resonator field 203) is parallel to the detection coil 209. The angle of separation between the two excitation coils can be varied (e.g., 0-45 degrees) depending on the sample type. For example, the design in FIGS. 2 and 3 is convenient for EPR imaging of mice (breast tumors, brain). The angle may be optimized given the degree of isolation variation. Larger angles give a wider range of control but lower total excitation power, and vise-versa.

Voltage controlled capacitors (VCCs) 215 can be used to achieve the desired control of the coil impedance and therefore isolation tuning. The resonance frequency remains the same.

Referring next to FIG. 3, shown is an image of an implemented bimodal resonator prototype. The bimodal resonator comprises two excitation coils 206 and a detection coil 209 as illustrated in FIG. 2. Excitation current of the two coils 306 can be independently controlled to adjust the combined RF field to be parallel to the detection coil 209. For example, the voltages supplied to VCCs in the excitation loops 206 can be adjusted (or tuned) to reduce or minimize the coupling between the excitation and detection coils. In some implementations, control feedback can be provided by monitoring the output of the detection coil 209 as the excitation coil voltages applied to VCCs are varied. Fast (<1 millisecond) voltage VCC scans can be periodically implemented to keep the inter-mode isolation during experiments or readings. This can be very important for in vivo images. For example, animal motion can modulate the resonator coupling which may cause saturation of the detector.

Figure 4A:
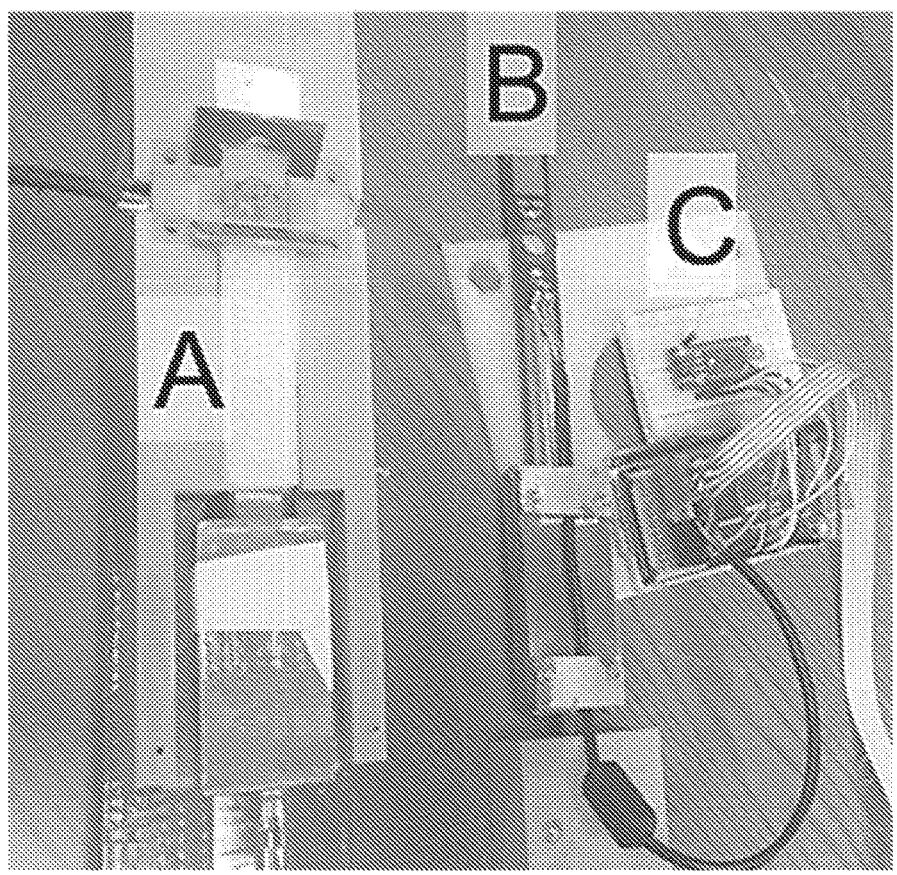
FIGS. 4A-4D are images of a fabricated bimodal resonator comprising parallel excitation coils, in accordance with various embodiments of the present disclosure.
Figure 4B:
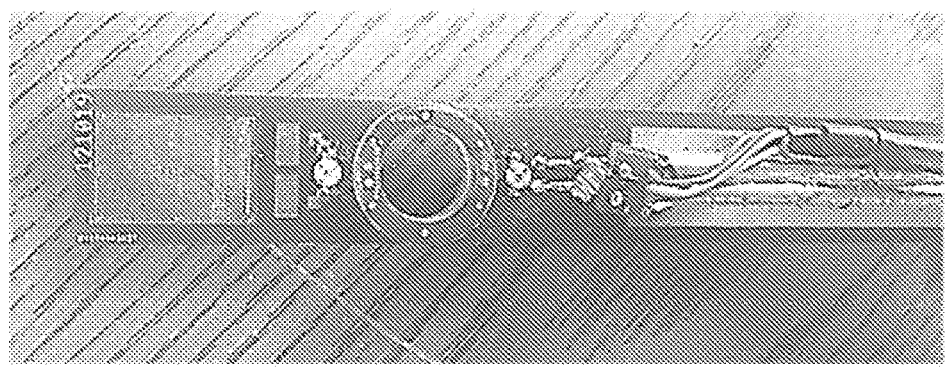
Figure 4C:
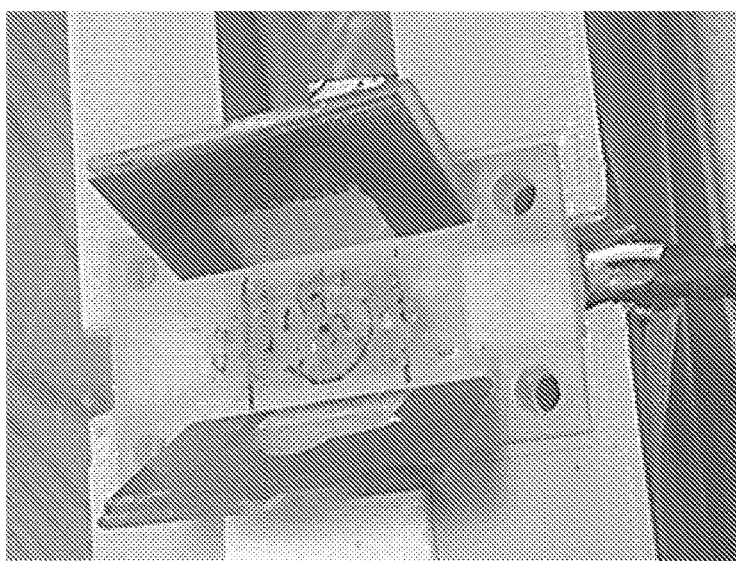
Figure 4D:
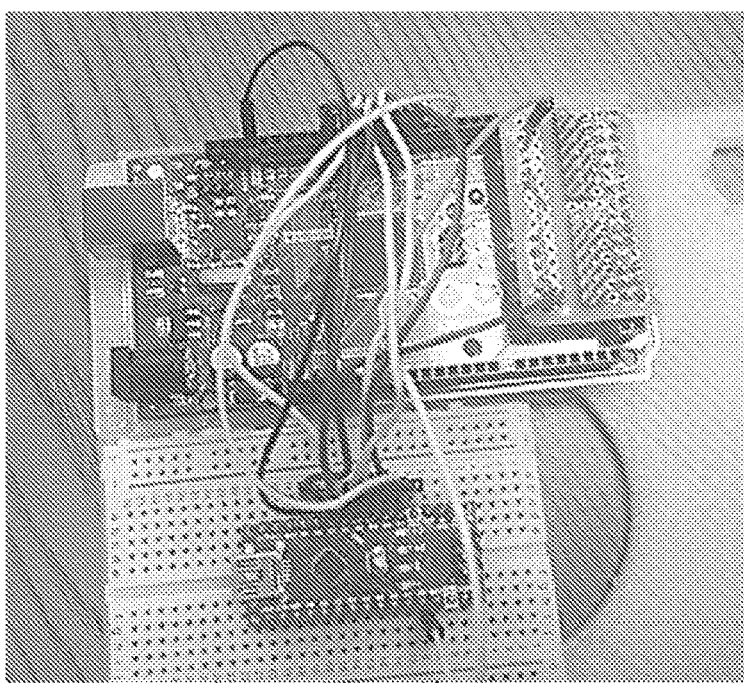

The bimodal resonator can be used for EPR spectroscopy, and can achieve a high degree of inter-mode decoupling, reduction of the background signal, and control of resonators' coupling, tuning, and isolation. Printed board circuit (PCB) technology can be used to fabricate resonator parts. FIG. 4A is an image showing examples of excitation (A), detection (B), and resonators controlled using microcontrollers and digitally tuned capacitors (C) that were built using PCB technology. Enlarged views of the detection coil structure, excitation coil structure, and the control circuitry are shown in FIGS. 4B, 4C and 4D, respectively. Support structures for the resonators were made using 3D printed parts. Remote control of the RF circuits can be provided using varactors, voltage-controlled capacitors (VCC), and digitally tunable capacitors (DTC). The small-size DTCs can operate in the range of 0.6-5 pF (up to 3 GHz in frequency).

The use of DTCs is advantageous for rapid scan EPR (RS EPR) imaging. In comparison with voltage-controlled capacitors, DTCs are not sensitive to the voltages induced by rapid magnetic field scans. With analog controls, the controlling signals were low-pass filtered to suppress noise and background contributions due to the voltage modulation effect. This filtering reduces time response for tuning, coupling, and isolation controls down to the sub-seconds range. In comparison, the DTC switching time is much shorter (about 12 microseconds). DTCs are compatible with microcontrollers, such as Arduino and faster Teensy. Both types of controllers can be configured to switch capacitance values upon receiving short serial commands. As a result, automated real-time highly reproducible tuning/coupling/isolation adjustments are possible.

Automation can be done by switching the capacitances and measurements of the reflection/transmission signal voltages for a given discrete DTC value. The optimum parameters can be selected for EPR measurements. Microcontrollers can provide real-time operations of the bimodal resonator. They also can be remotely controlled from a computer. GUI software (e.g., MATLAB) can automatically or in a response to user command briefly interrupt and subsequently change the running code. For example, switching between reflection and transmission modes can be readily achieved for bi-modal resonator operation.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A bimodal resonator, comprising:
a detection coil;
first and second excitation coils, where the first and second excitation coils are non-parallel separated by a fixed angle; and
excitation controllers coupled to the first and second excitation coils, the excitation controllers configured to adjust radio frequency (RF) fields generated by the first and second excitation coils to produce a resonator field substantially parallel with the detection coil.

2. The bimodal resonator of claim 1, wherein the excitation controllers comprise voltage-controlled capacitors (VCCs) that are switched to control the RF fields generated by the first and second excitation coils.

3. The bimodal resonator of claim 1, wherein the excitation controllers comprise digitally tunable capacitors (DTCs) that are switched to control the RF fields generated by the first and second excitation coils.

4. The bimodal resonator of claim 1, wherein the fixed angle is in a range from about 5 degrees to about 60 degrees.

5. The bimodal resonator of claim 4, wherein the fixed angle is in a range from about 5 degrees to about 45 degrees.

6. The bimodal resonator of claim 5, wherein the fixed angle is in a range from about 10 degrees to about 30 degrees.

7. A method, comprising:
providing a bimodal resonator comprising first and second excitation coils, where the first and second excitation coils are non-parallel separated by a fixed angle;
generating a first radio frequency (RF) field by exciting the first excitation coil;
generating a second RF field by exciting the second excitation coil; and
producing a resonator field substantially parallel with a detection coil of the bimodal resonator by adjusting the RF field of the first excitation coil, the RF field of the second excitation coil, or both.

8. The method of claim 7, wherein the excitation of the first and second excitation coils are supplied by corresponding excitation controllers.

9. The method of claim 8, wherein the corresponding excitation controllers comprise voltage-controlled capacitors (VCCs) that are switched to control the RF fields generated by the first or second excitation coil.

10. The method of claim 8, wherein the corresponding excitation controllers comprise digitally tunable capacitors (DTCs) that are switched to control the RF fields generated by the first or second excitation coil.

11. The method of claim 7, wherein the excitation of the first and second excitation coils is adjusted by controlling current through that excitation coil.

12. The method of claim 7, wherein the fixed angle is in a range from about 5 degrees to about 60 degrees.

13. The method of claim 12, wherein the fixed angle is in a range from about 5 degrees to about 45 degrees.

14. The method of claim 13, wherein the fixed angle is in a range from about 10 degrees to about 30 degrees.

* * * * *